Inventors
BEN ALEXANDER
MORTIMER ROGOFF
MALCOLM C. VOSBURGH
By
Attorney

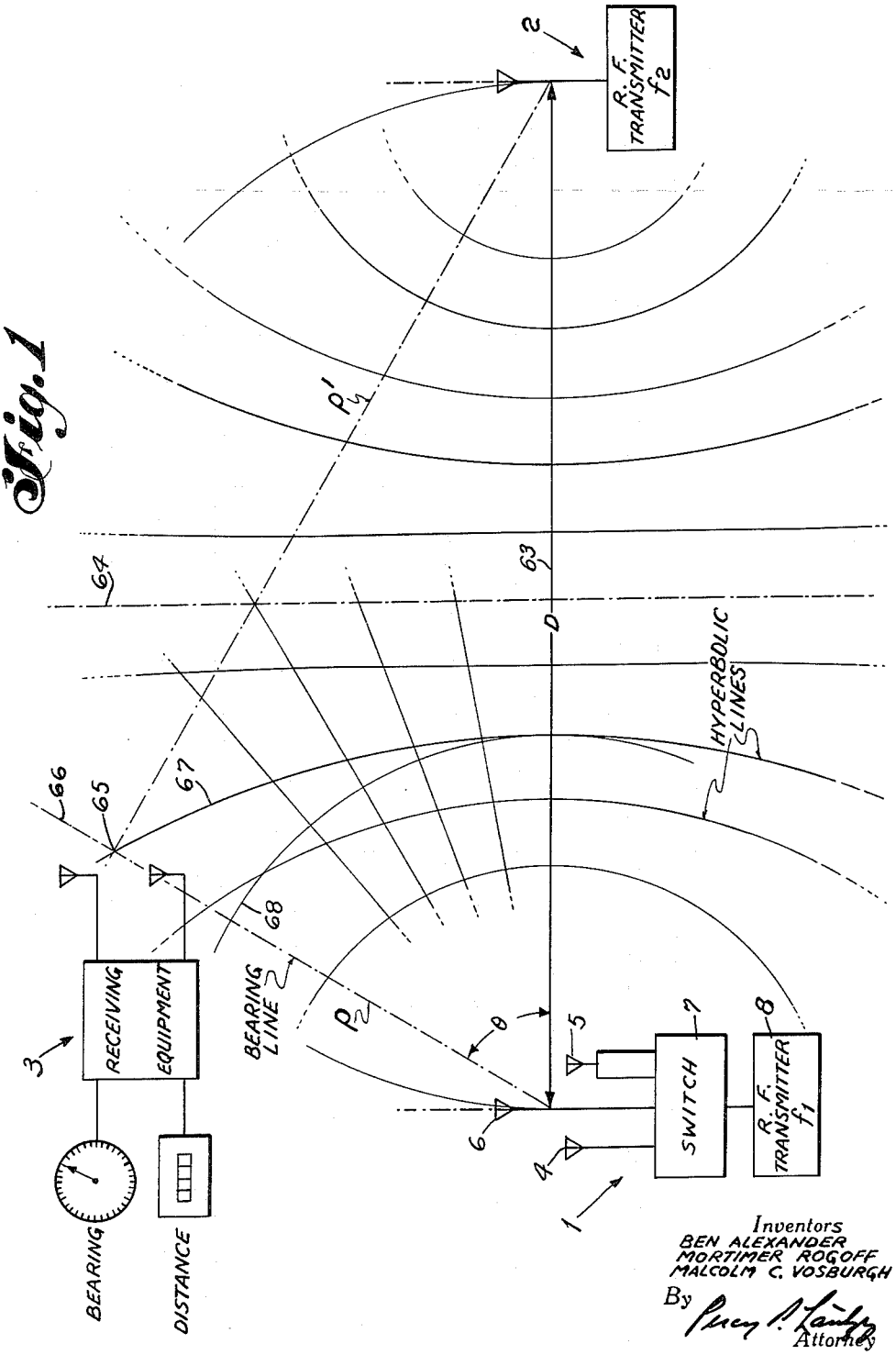

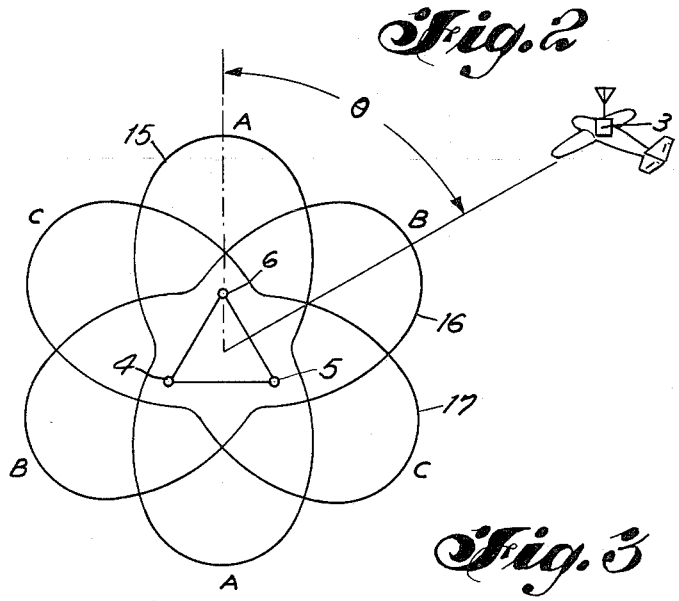
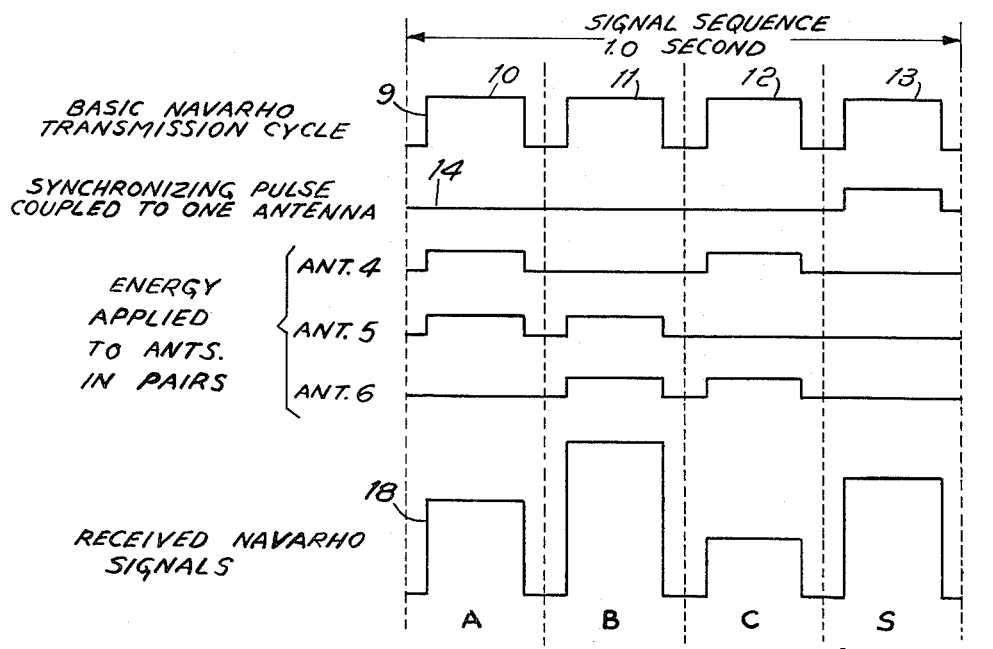

Inventors
BEN ALEXANDER
MORTIMER ROGOFF
MALCOLM C. VOSBURGH
By Percy P. Lantz
Attorney

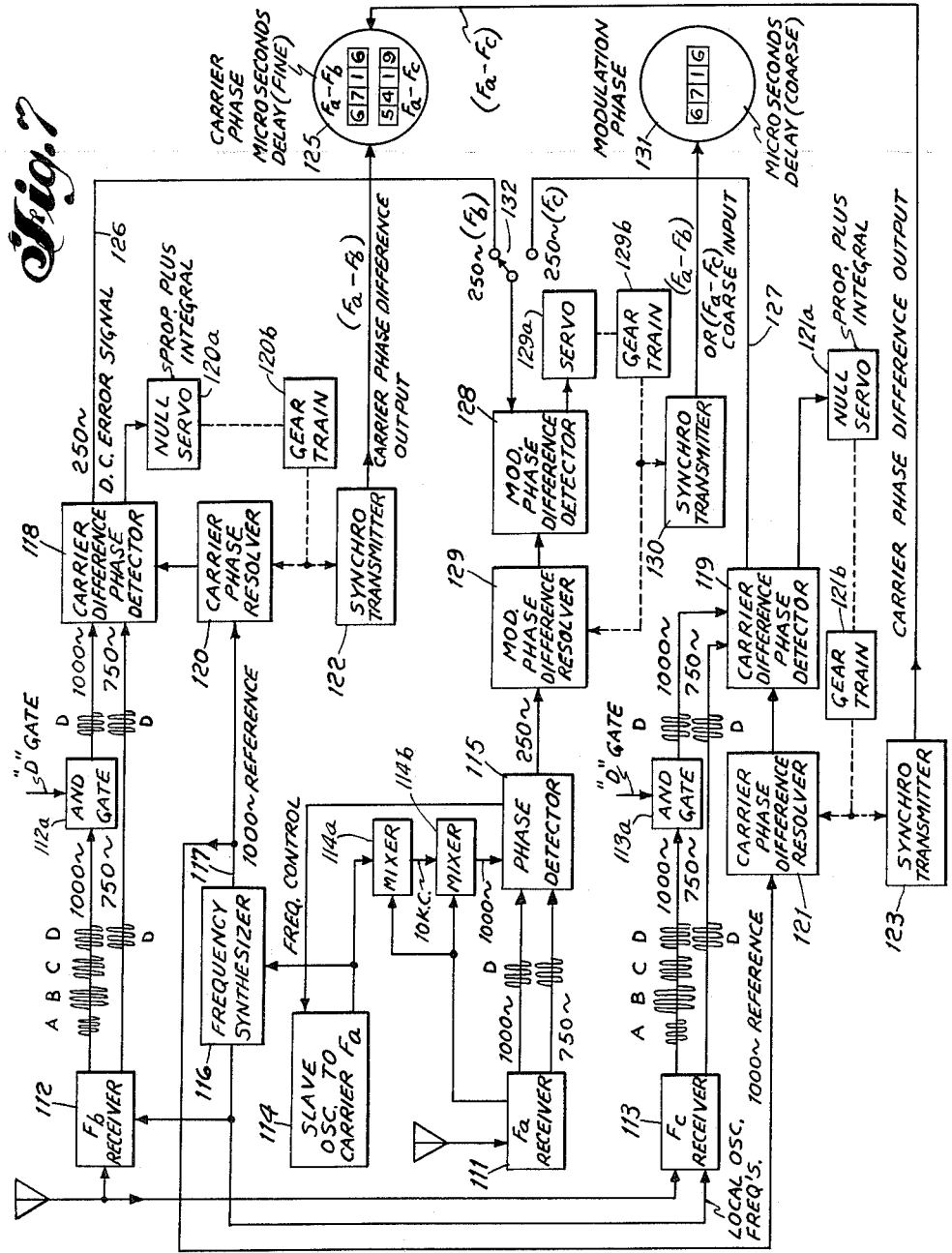

2,975,417
LONG RANGE RADIO NAVIGATION SYSTEM

Ben Alexander and Mortimer Rogoff, Nutley, and Malcolm C. Vosburgh, Montclair, N.J., assignors to International Telephone and Telegraph Corporation, Nutley, N.J., a corporation of Maryland Filed June 27, 1957, Ser. No. 668,525

11 Claims. (Cl. 343—105)

This invention relates to radio navigation systems and more particularly to long range type of radio navigation systems which yields bearing and distance information to a mobile craft from a ground beacon site.

For long range navigation, particularly for guiding aircraft over routes crossing oceans, it is desirable that radio beacon systems be provided which are reliable in operation so that scheduled travel may be maintained substantially all of the time. Due to long stretches of ocean between land bases, it is essential that the beacon transmissions of such systems have a range of from 1500 to 2000 miles. For the usual type of radio range beacons, operable over short or intermediate distances, it has generally been considered more suitable to use relatively short waves and broadband equipment. It has been proposed, however, that for reliability over long distances, long range navigation radio beacon systems be provided operating at relatively low frequencies and with relatively narrow bandwidths. Such a type of radio beacon system has been disclosed by way of example in U.S. Patent No. 2,524,765, issued to Henri G. Busignies and Paul R. Adams, and U.S. Patent No. 2,510,065, issued to H. G. Busignies, P. R. Adams and R. I. Colin. In such a system it has been shown that very high reliability with reasonable power consumption could be expected if the system operated in a low frequency region, for example, around 100 kilocycles and utilized extremely narrow frequency bandwidths. In U.S. Patent No. 2,541,040 issued to R. I. Colin, an improved version of this type of radio navigation system, now known as "Navaglobe," was provided which consisted essentially of three transmitting antennas arranged in an equilateral triangle and which were successively energized in pairs so that different directional distribution of energies were produced in different angular sectors omnidirectionally about the beacon. Although extremely accurate azimuth indications were obtainable by using the Navaglobe signals, for relatively coarse indications, with an accuracy of 1° or 2°, the three transmitting antennas were spaced less than a half wavelength apart and successively energized cophasally in pairs with one of the antennas being energized to produce an omnidirectional pattern at the beginning of each cycle to function as a synchronizing signal. When the signals were received aboard a mobile craft, the synchronizing signal served to control the distribution of the other received energies at the receiver so that the successively received energies or bearing signals were applied to different windings of a three coil ratiometer. The ratiometer needle then assumed a position dependent upon the resultant field in the three coils to provide the bearing of the craft with respect to the beacon.

It has been recognized that an ideal system for position fixing is one which could provide at the craft both the distance and bearing indications with respect to a single ground station. By combining the advantages of the long range bearing system known as Navaglobe with means which could provide long range distance measurements, a superior complete aerial navigation position fixing system is provided which has been generically termed "Navarho." Such a "Navarho" system is disclosed in the copending application of M. Dishal and M. Rogoff, Serial No. 491,082, filed February 28, 1955, now Patent No. 2,924,820, issued February 9, 1960. In this copending application a radio navigation system is provided in which the transmitter transmits cyclically and successively a plurality of signals including a plurality of differently directed radiation pattern bearing signals and a synchronizing signal at a given frequency and phase. Each receiver carried by the mobile units includes means responsive to the bearing signals to provide azimuth indications, and by means of a source of stable reference signals such as obtainable from a crystal clock on board the craft and means for comparing the phase of said reference signals and the synchronizing signals from the beacon, a distance indication is obtained.

While encouraging operations have been obtained with the Navarho system, the weakest factor appears to be a satisfactory crystal clock as a highly reliable reference signal source. An object of this invention, therefore, is to modify the Navarho system in a manner to eliminate the need of a crystal clock or the like on board the craft and yet provide a long range radio navigation system which is highly accurate in both the bearing and distance information obtainable on board the craft. Another object of the invention is to utilize the bearing information obtainable from the Navarho beacon in conjunction with hyperbolic information obtainable from two beacons. Still another object is to provide an improved radio navigation system utilizing two or more beacon stations and a hyperbolic position determining device on board mobile craft.

In order to provide long range Navarho navigation coverage throughout the important areas of the globe, a distribution of 28 to 30 Navarho beacon stations has been proposed, the separation between beacons being approximately 2000 miles. Since the range of the Navarho beacon has proven to exceed 2000 miles there is available beacon signals from at least two beacon stations for most of the areas covered and in others signals from three or more beacon stations are available. One of the features of this invention makes use of the fact that signals from at least two beacon stations are obtainable simultaneously in practically all areas. By means of receiving signals from two different beacons at a known distance separation, it is possible to obtain a differential distance of the mobile craft with respect to the two stations by comparing the phase of the carrier frequencies of the two stations after reduction to a common frequency or by comparing the phase of a wave modulation imposed on the carriers. This establishes a hyperbolic line on which the craft is located with respect to the nearest of the two beacons. By obtaining the bearing of the craft with respect to the nearest beacon the position of the craft on the hyperbolic line is determined by the intersection of the bearing and hyperbolic lines. By means of a coordinate converter mechanism on board the craft the exact distance of the craft to the nearest beacon is obtained so that the craft may have continuous tracking information for navigation.

Another feature of the invention utilizes two hyperbolic lines determined from information receivable from three beacons to obtain the location of the craft. By means of this embodiment the Navarho beacon bearing information is not essential although it may be used, if available, to confirm the tracking information obtained from the hyperbolic indications.

The above-mentioned and other features and objects of this invention will become more apparent by reference to the following description taken in conjunction with the accompanying drawings, in which:

Fig. 1 represents schematically and in block diagram the general relation of the beacon system and a mobile craft carrying receiving equipment according to one embodiment of this invention;

Fig. 2 illustrates the field pattern distribution of one of the beacons;

Fig. 3 is a graphical representation of the signal switching cycle utilized in conjunction with the beacon field pattern illustrated in Fig. 2;

Fig. 7 is a schematic and block diagram of the receiver equipment carried by the mobile craft indicated in Fig. 6.

Figure 4:
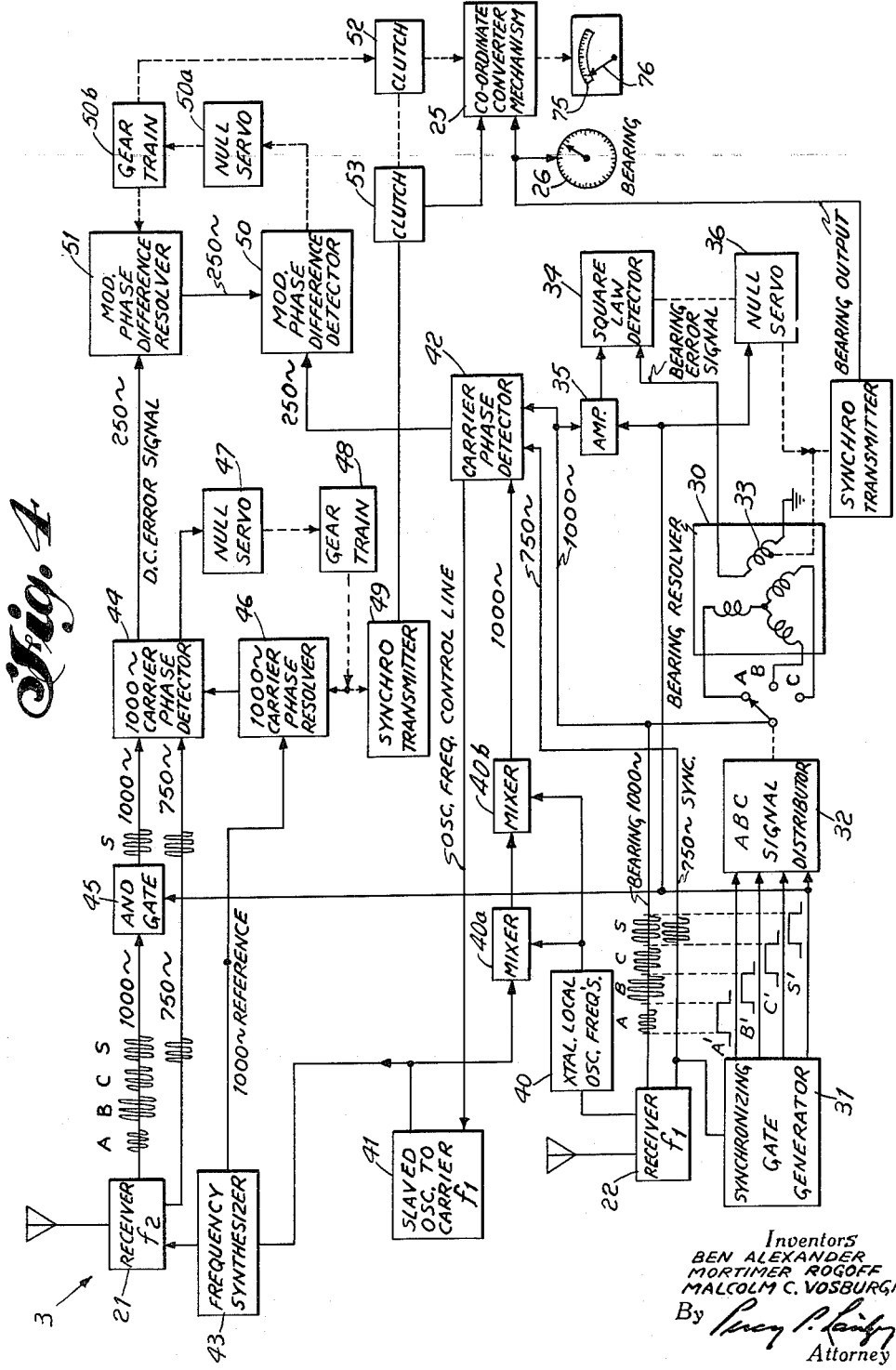
Fig. 4 is a schematic and block diagram of the receiver equipment carried by the mobile craft indicated in Fig. 1.

Referring to Fig. 1, a radio navigation system in accordance with this invention is shown to comprise two ground beacon stations 1 and 2 spaced apart a distance D and a mobile receiver 3. While only two beacons are shown, it will be understood that were a larger area shown in the drawing additional beacons would be included, the beacons being distributed approximately 2000 miles apart so that aircraft flying over the area will be able to receive signals simultaneously from two or more beacons. In the North Atlantic area, for example, three or four Navarho stations may be received simultaneously, thus enlarging the number of fixes that are possible by hyperbolic lines. In the illustration of Fig. 1, beacon 1 is shown to be a typical Navarho beacon operating on a carrier frequency $f_1$ while beacon 2 is shown to be a simple beacon transmitting a modulated carrier $f_2$ for identification of the beacon station. The beacon 2 may be a Navarho type of beacon, should it be required for bearing information. According to the present invention, however, all beacons need not be of the Navarho type since according to the present embodiment only one of the beacons from which signals are received need be of the Navarho type.

The hyperbolic lattices shown in Fig. 1 can be created from either measurements made on a common modulation tone from the two stations, or by differential phase measurements made between the two received carrier signals. As in the case of Navarho distance measurement, these two different measurements result in a form of coarse and fine hyperbolic network. If a modulation frequency of 250 c.p.s. is used, the hyperbolic lines of position will recur every 340 miles along the base line. This represents the extent of the ambiguity in the system. If carrier phase measurements are used, the lines of position will repeat every 8/10 of a mile, exhibiting a much greater sensitivity of change with respect to motion of the observer. In the case of coarse phase measurement it is necessary to insert into the phase measuring servomechanism the known distance between the receiving equipment and the beacon from which distance is measured. After this is done, 360° of differential phase will be measured approximately every 0.8 mile and this will be converted into mile distance from the beacon. In other words, the equipment will continuously track and display the correct distance from the beacon after this initial setting is made.

All users of the Navarho system will be within the reception area of at least a pair of stations at a time. A twenty-eight to thirty station network over the globe assures this performance. Coverage from a pair of stations is assumed to lie within a circle whose diameter is the baseline between the pair of stations. At all points within this circle the bearing lines will intersect hyperbolic lines at an angle between 45° and 90°. On the basis of this limitation, the twenty-eight–thirty station network provides useful bearing and hyperbolic fixes within all important areas of world navigation.

Referring more particularly to beacon 1 shown in Fig. 1 and the illustrations in Figs. 2 and 3, the principles of the Navarho beacon will be described. The beacon is provided with three antennas 4, 5 and 6 located at the corners of an equilateral triangle. Coupled by means of a switch 7 is an R.-F. transmitter 8 which provides a carrier frequency $f_1$. The switch 7 applies the carrier frequency to the antennas in sequence as illustrated in Fig. 3. More specifically the basic transmission cycle is shown by curve 9, each one second period being divided into four pulses 10, 11, 12 and 13. The switching circuit applies one of the pulses, such as 13, to one of the antennas, such as 5, for synchronizing purposes. This is indicated in the time sequence by curve 14. The first pulse 10 of the series is applied to antennas 4 and 5 simultaneously thereby producing a directive pattern, such as illustrated at 15. The pulse 11 is applied next in sequence to antennas 5 and 6 thus producing pattern 16. Pulse 12 is similarly applied to antennas 4 and 6 in its turn to produce pattern 17. Assuming that the receiving equipment 3 is in line with the pattern 16, as shown in Fig. 2, the pulse reception will be substantially as shown by curve 18 and are labeled A, B, C, and S, the signal S being the synchronizing signal which is transmitted omnidirectionally by the antenna 5.

The operation of the Navarho beacon as well as a form of bearing indicating receiver is described in the aforementioned patent to R. I. Colin, No. 2,541,240, and in the aforementioned copending application of M. Dishal-M. Rogoff, Serial No. 491,082.

Referring to Fig. 4, the receiver equipment 3 is shown to comprise two receivers 21 and 22. The first receiver 21 is used in conjunction with the reference frequency $f_1$ of a slaved oscillator which is controlled by the second receiver 22, to establish the hyperbolic line 67 on which the craft is located. The second receiver 22 together with its associated circuitry responds to the Navarho bearing signals A, B, and C, to establish the bearing or azimuth line 66 which intersects the hyperbolic line 67 at the location of the craft. With these coordinates determined, the voltages thereof are applied to a converter 25 to obtain the distance of the craft from the nearest beacon. The craft bearing and distance is displayed on indicators 26 and 75, 76.

The Navarho portion of the receiver equipment of Fig. 4 will now be described. Referring again to Fig. 2, the magnitude of the transmitted beacon signals varies sinusoidally at constant radius around the figure-of-eight patterns for each antenna pair. Since each antenna pair axis is 120 degrees from the preceding pair, three sinusoids with 120 degrees separation are observed at constant radius from the beacon station. This unique radiation pattern permits the use of a precision 3-phase resolver 30 at the receiver for bearing derivation.

The receiver 22 is a known broadband receiver wherein the carrier $f_1$ is reduced by double conversion to 1000 c.p.s. and 750 c.p.s. The synchronizing pulse S is fed to generator 31 to provide gate pulses A', B', C', and S', in synchronism with the received pulses A, B, C, and S. These gate pulses are applied to a signal distributor 32 to selectively route the received bearing pulses to the proper stator windings of the bearing resolver 30. The voltage induced in the resolver rotor 33 is proportional to the sine of the rotor shaft angle. This voltage is applied to one stator winding of a square law detector 34. The detector 34 is a very sensitive 2-phase drag-cup motor which is well known wherein its rotor displacement is proportional to the product of the applied voltages. The bearing pulses from the output of the receiver 22 are passed through an amplifier 35 which imparts a 60-degree phase shift and for pulse S elimination before being applied to the quadrature winding of the drag-cup motor.

The 60-degree phase difference produces optimum torque in the 2-phase drag-cup motor.

If the bearing resolver rotor is initially set at the correct angle for the bearing signal ratio being received, then the detector rotor will be displaced in one direction for the A and B pulses, but will be displaced in the opposite direction by the C pulse. The sum of the rotor motion during the A and B signals will be equal but opposite to the motion during the C signal. Hence the net displacement will be zero at the end of the pulse sequence. The rotor shaft error, zero in this example, is sensed by a servo 36 at the end of the ABC pulses, and corrects the bearing resolver rotor angle during the S interval in a direction to correct the computed bearing angle. The action of the square law detector-integrator is equivalent to vectorial addition, and the resultant vector error is unaffected by equal amounts of noise power in each bearing pulse.

The synchronizing gate generator 31 which is well known derives a one c.p.s. timing pulse by binary division from a 256 c.p.s. tuning fork oscillator, not shown. The timing pulse is coincident with the received carrier sync pulse; and if it is not, shifting the phase of the tuning fork output will maintain coincidence. The A, B, and C gates are derived from the same binary divider. The flywheel action of this tuning fork oscillator allows maintenance of synchronization in the presence of heavy noise or temporary loss of signal.

Since the ratio of the A, B, and C pulses is a measure of bearing, the automatic gain control for the receiver 22 adjusts receiver gain during the S interval only. In principle, the ABC carrier pulses are integrated to yield a D.C. voltage proportional to signal strength. This is done because of the nature of the transmitted pattern; the sum of the three received signals being virtually constant for all bearings from the transmitter.

The foregoing description of receiver 22 and associated circuitry comprises the Navaglobe portion of this invention, that is, the portion which provides for bearing information at the craft by reception of beacon signals A, B, C, and S. The next portion to be described is the portion associated with the receiver 22 which provides a reference frequency $f_1$ for phase comparison with the carrier frequency $f_2$ of receiver 21. The frequencies of the crystal local oscillator 40 of receiver 22 are used to convert the frequency of slaved oscillator 41 to an I.F. frequency of 1000 c.p.s., for example. This conversion is accomplished by the action of mixers 40a and 40b. A carrier phase detector 42 provides a phase error detection at 1000 c.p.s. for application to the slaved oscillator 41 to lock the latter to the carrier frequency $f_1$.

The output of oscillator 41 is applied to the frequency synthesizer 43 for derivation, by known division and single side-band techniques, of the local-oscillator frequencies for receiver 21 and a 1000 cycles per second reference frequency.

The 1000 c.p.s. output of receiver 21 is compared in phase to the 1000 c.p.s. reference frequency in the carrier phase detector 44. This is done during the synchronizing period of pulses by means of gate 45. The difference in phase detected is the phase difference between stations 1 and 2. The spacing between hyperbolic lines on the base line 63 between stations is approximately equal to one-half the wavelength of the average of the carrier frequencies. For carriers in the 100 kc. band this is approximately eight-tenths of a mile.

The shaft position information of the carrier phase resolver 46 associated with servo 47 and gear train 48 is coupled to a coordinate converter 25 through a synchrotransmitter 49. The coordinate converter also receives bearing information from the receiver 22 and its associated bearing deriving circuitry. This unit converts baseline distance to actual radial distance from the nearest beacon station such as station 1. Thus, bearing and radial distance with respect to station 1 are displayed at the indicators 26 and 75, 76.

It is sometimes desirable to obtain a coarse indication of distance for an initial setting of the indicators. For this purpose the circuit is provided with means to detect a relatively low frequency modulating signal with which the carrier frequencies are modulated, the low frequency modulation being in the order of 250 c.p.s. This coarse distance indication is provided by measuring the modulation phase difference. The output of the carrier phase detector 44 contains a modulating frequency component such as 250 c.p.s. which is compared in phase at detector 50 with the modulation frequency output of carrier phase detector 42 to yield modulation phase difference. Modulation phase resolver 51 shifts the modulation phase of carrier $f_2$ to equal the modulation phase of carrier $f_1$. Resolver 51 is driven by null servo 50a via gear train 50b in response to a shaft output from phase detector 50. The number of degrees of resolver rotation is a measure of distance on station-to-station baseline, with coarse spacing between hyperbolic lines of 324 miles, for a modulation frequency of 250 c.p.s. The coordinate converter yields the radial distance along the actual bearing from station 1. Operation of the coarse distance indication is obtained by clutch 52 coupling the shaft information of modulation phase resolver 51 into the coordinate converter 25. When clutch 52 is engaged, clutch 53 is disengaged. This coarse indication may be made initially and then followed by a fine indication by using the carrier frequency comparison.

Figure 5:
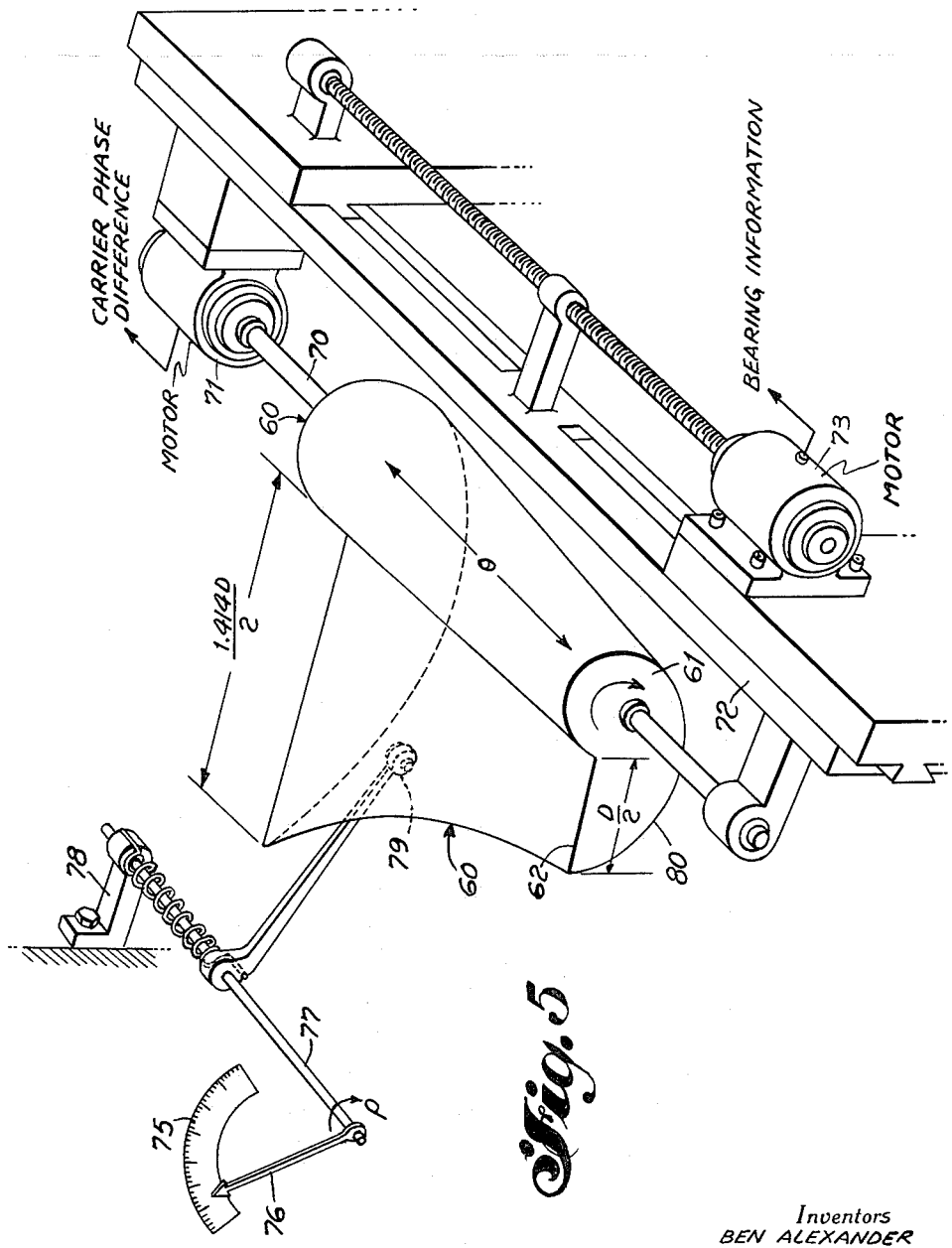
Fig. 5 shows in perspective a cam type of coordinate converter mechanisms used in the receiver equipment of Fig. 4.

The coordinate converter 25 may be an electronic converter or preferably it may comprise a cam arrangement. In Fig. 5 a cam 60 is shown which is controlled by the bearing and carrier phase difference informations. The bearing angle information controls the axial position of the cam while the carrier phase difference controls the rotational position of the cam. In Fig. 5, the forward end 61 of the cam represents zero bearing with respect to the base line between stations 1 and 2, Fig. 1, and the portion 62 represents one-half of the distance D between the stations. In Fig. 1, 63 is the base line while line 64 is the half way mark. 65 represents the location of the craft and as shown is at the intersection of radial bearing line 66 and the hyperbolic line 67. Since the distance of the hyperbola 67 at the base line is represented by the radius of circle 68, the cam must make a correction proportional to the size of the bearing angle $\theta$ measured from the base line. This cam variation is represented by the increasing length of the radial portion 62 as one progresses axially of the cam. At the far end of the cam the length of this radial portion is increased to $$\frac{1.414 D}{2}$$

The cam is supported on a shaft 70 and is controlled in its rotational position by motor 71 in accordance with the carrier frequency phase difference. The carriage 72 for the cam unit is caused to move axially by motor 73 which is controlled by the bearing information.

The distance indicator is shown to be a simple calibrated dial and pointer arrangement 75, 76. The pointer 76 is carried by a pin 77 which is rotatably supported at 78 and controlled by follower 79 which engages the curved surface 80 of cam 60.

Fixes can be obtained in Navarho by the intersection of two hyperbolic lines of position. To do this requires a minimum of three stations within the reception area of a receiving equipment. In many areas on a worldwide network of 28 to 30 stations it is possible to receive signals from three or more stations simultaneously; in other areas only two stations can be used. If it is desirable to add an auxiliary station in an area, it can be done with a relatively simple installation. This type of auxiliary station need only transmit its signals from a single antenna. Since no bearing information will be radiated it is not necessary to form directional patterns at the ground station. The signals that are transmitted will be a pair of stabilized frequencies that are separated by a frequency difference equal to the system modulation frequency. The normal time sequence of Navarho signals will be used at this station; that is, the distance signals will be transmitted at a time when other stations in the network are also transmitting distance information. The site requirements for such a station are modest since only a single transmitting antenna need be accommodated. Therefore, these stations can be installed in locations where it would not be possible to set up a complete Navarho bearing plus distance transmitter. Many islands, for example, which could not contain an entire Navarho installation can easily accommodate this simple distance-only facility.

Figure 6:
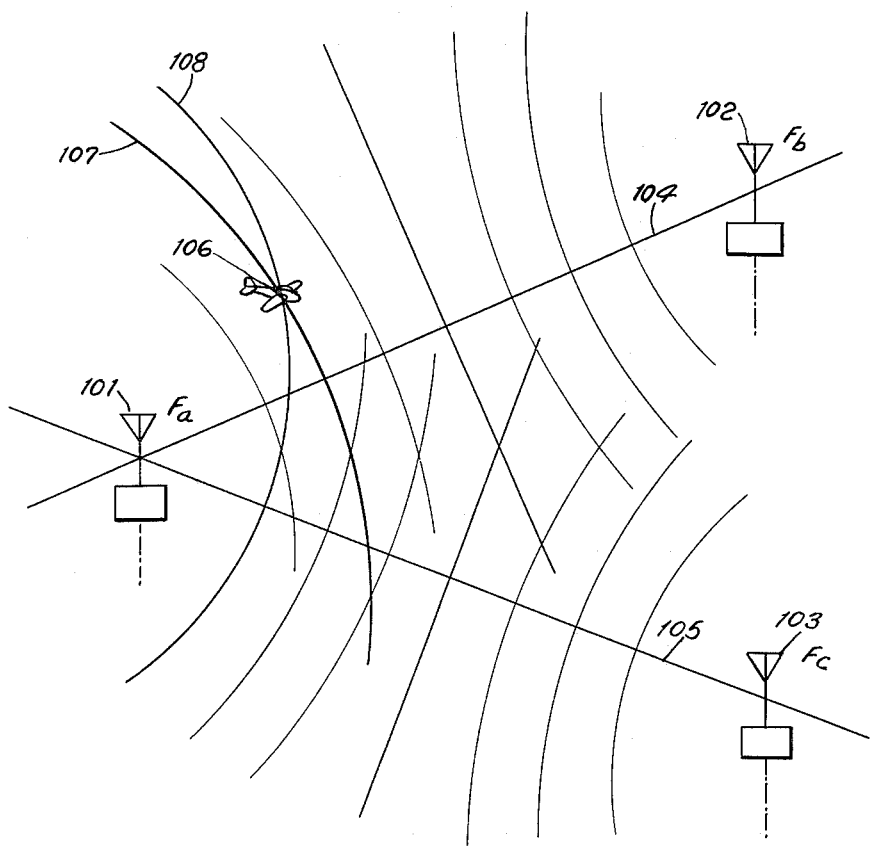
Fig. 6 represents schematically and in block diagram the general relation of a beacon system and mobile craft capable of operating on hyperbolic information obtainable from three beacons.

Referring to Fig. 6, an area is shown containing three transmitting stations 101, 102 and 103, all of which may be of the Navarho type or one or two may be of the auxiliary type. The length of base lines 104 and 105 between stations are predetermined in the order of 2000 miles. The craft location is indicated at 106, near station 101. The nearest intersecting hyperbolic lines of the two sets of stations, station 101 being common to both, are indicated at 107 and 108. The carrier frequencies $F_a$, $F_b$ and $F_c$, of these stations are preferably modulated with a frequency in the order of 250 c.p.s. so that coarse fixing may be obtained as well as fine fixing.

In Fig. 7 the receiver equipment of the craft is shown. The carrier and modulation signals from the three stations 101, 102 and 103, are used to establish the intersection of the two hyperbolic lines 107 and 108, for position determination within their mutual coverage area. The frequency $F_a$ of the nearest station 101 is chosen as the reference for phase comparison. Carrier phase difference is measured between $F_a$ and $F_b$, and $F_a$ and $F_c$ at a common frequency of 1000 c.p.s. derived from each carrier by double frequency conversion. This places the aircraft on a hyperbolic line of given phase difference for each pair of stations. The intersection of these two lines-of-position indicates present position. The spacings between adjacent hyperbolic lines at the base line are approximately one-half the average wavelength of the two received carriers, which is approximately eight-tenths of a mile.

The 250 c.p.s. modulation from each station is synchronously detected to provide coarse hyperbolic lines-of-position which establishes initial position if not known. The coarse spacings of hyperbolic lines are equal to one-half the wave-length at 250 c.p.s. or 324 miles.

In the receiver equipment in Fig. 7, the receiver 111 is tuned to receive the carrier $F_a$ from station 101, receiver 112 receives carrier $F_b$ of station 102 and receiver 113 receives carrier $F_c$ of station 103. The slaved oscillator 114 is locked to a carrier $F_a$ by phase comparison at 1000 c.p.s. in phase detector 115. Mixers 114a and 114b serve to beat down the frequency output from oscillator 114 in two steps to 1000 c.p.s. for phase comparison with the output of receiver 111. The $F_a$-minus-250 c.p.s. carrier is also available at the output of receiver 111 as 750 c.p.s. This is also applied to the phase detector 115 to produce a 250 c.p.s. output for modulation phase difference measurement. The output of the slaved oscillator 114 is fed to frequency synthesizer 116 which produces by division and mixing, "local-oscillator" frequencies for receivers 112 and 113 and a 1000 c.p.s. "$F_a$" reference frequency at 117. The 1000 c.p.s. "$F_a$" reference is phase-compared to the "$F_b$" 1000 c.p.s. output of receiver 112 at detector 118 for $F_a-F_b$ carrier phase difference, and phase compared to "$F_c$" 1000 c.p.s. output of receiver 103 at detector 119 for $F_a-F_c$ carrier phase difference. Gates 112a and 113a coupling the 1000 c.p.s. outputs from receivers 112 and 113 to detectors 118 and 119, respectively, are controlled by signals in time coincidence with "D" pulses so that phase comparisons of 1000 c.p.s. signals in detectors 118 and 119 are made during the synchronizing intervals. The associated carrier phase difference resolvers 120 and 121 insert the necessary phase shifts so as to make the 1000 c.p.s. "$F_a$" reference co-phasal with the "$F_b$" and "$F_c$" 1000 c.p.s. signals, respectively by the actions of null servo 120a driving resolver 120 via gear train 120b in response to the output of detector 118 and null servo 121a driving resolver 121 via gear train 121b in response to the output of detector 119. The shaft positions of resolvers 120 and 121 are synchro-transmitted at 122 and 123 respectively to a dual microsecond indicator 125 which reads microseconds of time difference directly. With these indications the navigator of the craft can easily plot the position of the craft.

For coarse indication, the carrier phase difference detectors 118 and 119 also provide 250 c.p.s. modulation phase output signals at 126 and 127 which are compared at 128 to the "$F_a$" 250 c.p.s. modulation phase. The modulation phase difference resolver 129 inserts the proper phase angle in the "$F_a$" 250 c.p.s. signal so as to make it co-phasal with the "$F_b$" or "$F_c$" 250 c.p.s. signal in the modulation phase difference detector 128. This is accomplished by the action of servo 129a driving resolver 129 via gear train 129b in response to the output of detector 128. The resolver shaft position is transmitted at 130 to the coarse microseconds indicator 131, which reads coarse microseconds difference. This display can be switched at 132 for either the "$F_a$"—"$F_b$" or "$F_a$"—"$F_c$" 250 c.p.s. phase difference.

In considering all the possible uses of Navarho described above, some general conclusions may be drawn as to the utility of this system. Navarho is well suited for modern air navigation. Of all the systems proposed, it is the only one that has successfully demonstrated the capability of providing fixing in terms of bearing and distance from a point on the ground. These polar coordinates are compatible with the common system Vortac and Tacan, short range aids now being implemented throughout the world. Since it generates polar coordinates, it can share a position computer or an auto-navigator with these short range aids. The pilot or navigator can read his position by means of a common system with the same display instruments. In its hyperbolic form, wherein distance is measured on a differential basis, the conversion from hyperbolic lines of position to radial distances is done internally by the receiver equipment without knowledge or assistance required by the user. This is attributable to the fact that bearing can be measured from every Navarho ground station. Navarho has already demonstrated its ability to measure distances at extremely long ranges from the ground stations. The extension of one-way distance measurement by means of an airborn frequency standard to differential distances measurement is a simple one and actually results in less complicated equipment in the aircraft.

The long effective range of the Navarho system means that a pair of Navarho ground stations can provide navigation in areas of the world where it is impossible to site the larger number of ground stations required for short range aids. Moreover, in this era of high speed flight, the fact that the service area of Navarho is so extensive means that it is not necessary to shift from one ground reference point to another many times during a flight as would be required by shorter range aids. Navarho can be used en route with accuracy compatible with the needs of traffic control. In almost all cases, a flight will begin and end with guidance from a short range distance-bearing or rho-theta navigation system. The transition from terminal area to en route control can be accomplished in the airplane by merely shifting from Tacan data to Navarho data. A flight then progresses with Navarho position fixing, with position known to an accuracy of a few minutes flying time throughout this phase of the journey. Termination of the flight is then made under the guidance of Tacan in the destination area.

In those cases where it is desirable to compute position as accurately as possible, the use of three Navarho ground stations will provide complete hyperbolic position fixing. These three stations, with their 2000-mile baselines, provide greater sensitivity of measurement. The hyperbolic contours within the service area never diverge to more than 50% of their baseline separation. This is equivalent to a sensitivity of no greater than 1½ miles per 360° of differential phase in any one measurement. With this degree of sensitivity equipment errors completely vanish from system accuracy considerations, and the only remaining uncertainties are those due to the vagaries of propagation.

To insure high accuracy, it will be necessary to make first-order corrections to observed delay readings. These will apply to those portions of the coverage area where the modes of propagation are well defined. In other words, it is possible to assume that ground wave signals dominate the areas close to a transmitter and sky wave modes are the predominant signals further out. By making such corrections, it will be possible to predict mode delay differences to within a few microseconds, thereby retaining at least one mile accuracy in the position fix.

While we have described above the principles of our invention in connection with specific apparatus, it is to be clearly understood that this description is made only by way of example and not as a limitation to the scope of our invention as set forth in the objects thereof and in the accompanying claims.

We claim:

1. A radio position indicating device for use on board a mobile craft to indicate the location of the craft with respect to a selected one of a plurality of spaced apart beacon transmitters which transmit radio signals at carrier frequencies different per beacon, said device comprising a first receiver means adapted to receive the carrier frequency signals of a first beacon and reduce it to a given frequency, a second receiver means adapted to receive the carrier frequency signals of a second beacon, said second receiver means having its local oscillator controlled by the frequency output of said first receiver means so that the frequency output of said second receiver means is at a frequency corresponding to the frequency output of said first receiver means, means to compare the phase of said given frequency with the phase of said corresponding frequency to determine the differential distance of the craft between said first and second beacons thus determining the hyperbolic line on which the craft is located and means responsive to signals from at least one of said beacons to determine a point on said hyperbolic line which is indicative of the bearing location of said craft.

2. A radio position indicating device according to claim 1, wherein said first beacon transmitter transmits bearing signals and said last named means includes means responsive to said bearing signals to resolve the bearing angle of said craft with respect to said first beacon.

3. A radio position indicating device according to claim 2, further including a coordinate converter, means to apply to said converter the bearing information and means to apply to said converter said differential distance information to obtain the distance of the craft to said first beacon.

4. A radio position indicating device according to claim 3, wherein said converter comprises a cam and follower arrangement to indicate distance, said cam having a surface for correction of distance in accordance with change in bearing and differential distance, means responsive to bearing information to effect a change in the relative follower-cam position axially of said cam and means responsive to said differential distance information to effect a change in the relative follower-cam position circumferentially of said cam.

5. A radio position indicating device according to claim 1, wherein said second receiver means includes means adapted to receive carrier frequency signals from a third beacon having its local oscillator controlled by the frequency output of said first receiver means so that the frequency output of said third receiver means is at a second frequency corresponding to said given frequency, and means to compare the phase of said second corresponding frequency with the phase of said given frequency to determine the differential distance of said craft with respect thereto, thus determining a second hyperbolic line which intersects with said first mentioned hyperbolic line, which point of intersection represents the location of said craft with respect to said beacons.

6. A radio position indicating device according to claim 1, wherein said carrier frequency signals are modulated with an identical low frequency signal, and said device includes means to detect the modulation frequency of each of the received carrier frequency signals and means to compare the phase of said modulation frequencies to obtain a coarse indication of the location of said craft.

7. A radio position indicating device for use on board a mobile craft to indicate the location of the craft with respect to a selected one of a plurality of spaced apart beacon transmitters which transmit radio signals including bearing signals at carrier frequencies different per beacon, said device comprising a first receiver adapted to receive the carrier frequency and bearing signals from a first beacon, a second receiver adapted to receive the carrier frequency signals from a second beacon, a slaved oscillator controlled by the frequency carrier signals of said first beacon, means to produce a frequency reference from the output of said slaved oscillator, means to derive local oscillator frequencies from said reference frequency to convert the carrier frequency received by said second receiver to a frequency corresponding to that of said reference frequency, means to compare the phase of said reference frequency with the phase of said corresponding frequency to determine the differential distance of the craft between said first and second beacons, and means responsive to said bearing signals from said first beacon to determine the bearing location of said craft with respect to said first beacon.

8. A radio position indicating device according to claim 7, further including means associated with each receiver to detect a modulation frequency with which each of said carrier frequencies are modulated and means to compare the phase of said modulation frequencies to obtain a coarse indication of the differential distance of said craft with respect to said first and second beacons, after which said reference frequency comparison is used as a fine indication of differential distance.

9. A radio position indicating device according to claim 7, further including a coordinate converter, said converter comprises a cam and follower arrangement to indicate distance, said cam having a surface for correction of distance in accordance with changes in bearing and differential distance, means responsive to bearing information to effect a change in the relative follower-cam position axially of said cam and means responsive to said differential distance information to effect a chnage in the relative follower-cam position circumferentially of said cam.

10. A radio position indicating device for use on board a mobile craft to indicate the location of the craft with respect to a plurality of spaced apart beacon transmitters which transmit radio signals at carrier frequencies different per beacon, said device comprising first, second and third receivers adapted to receive the carrier frequency of first, second and third beacons, respectively, means coupling the local oscillators of said second and third receivers to the output of the local oscillator of said first receiver whereby said second and third receiver oscillators are controlled by said first receiver oscillator so that said receivers produce, first, second and third output signals having a common frequency, means to compare the phase of these first and second output signals to determine the differential distance of the craft between said first and second beacons and means to compare the phase of the first and third output signals to determine the differential distance of the craft between said first and third beacons, the point of intersection of the two differential distance readings being the location of the craft with respect to said beacons.

11. A radio position indicating device according to claim 10, wherein said first, second and third carrier frequency signals include an identical modulation frequency, means associated with each receiver to detect said modulation frequency, means to compare the phase of the modulation frequencies received by said first and second receivers and means to compare the phase of the modulation frequencies of said first and third receivers to thereby obtain a coarse fix for said craft.

References Cited in the file of this patent

UNITED STATES PATENTS

| | | |
|---|---|---|
| 2,144,203 | Shanklin | Jan. 17, 1939 |
| 2,513,315 | Hawkins | July 4, 1950 |
| 2,598,290 | O'Brien | May 27, 1952 |
| 2,811,717 | Palmer | Oct. 29, 1957 |
| 2,871,474 | Koeppel | Jan. 27, 1959 |